(No Model.) 6 Sheets—Sheet 5.
J. FRANKENBERG.
LOCOMOTIVE VALVE GEAR.
No. 543,473. Patented July 30, 1895.
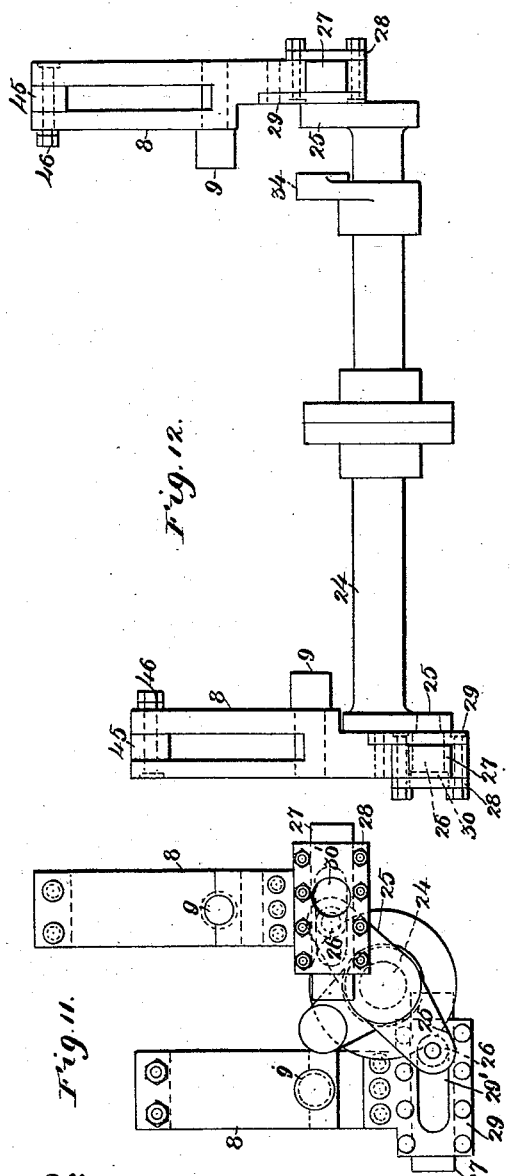
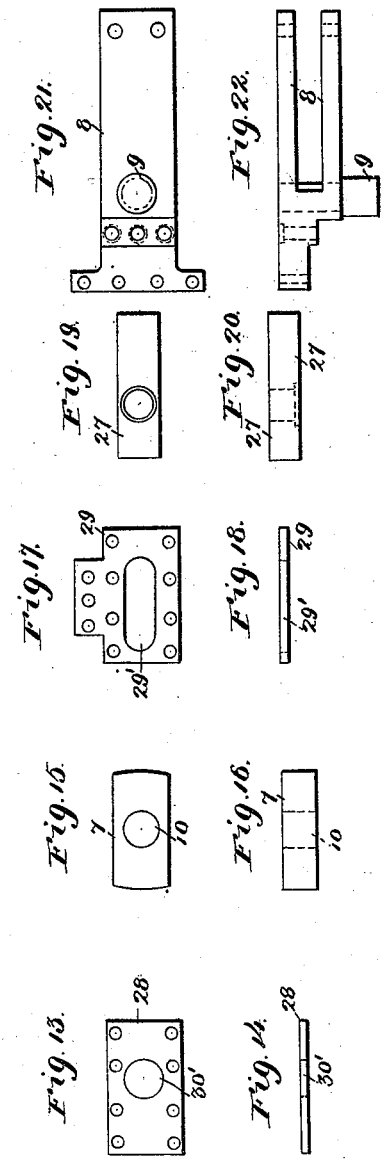
Witnesses
Hiram N. Stickel
W. M. Sweeney
Inventor
Julius Frankenberg.
By his Attorneys
Keller & Starck (No Model.) 6 Sheets—Sheet 6.
J. FRANKENBERG.
LOCOMOTIVE VALVE GEAR.
No. 543,473. Patented July 30, 1895.
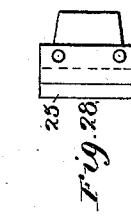
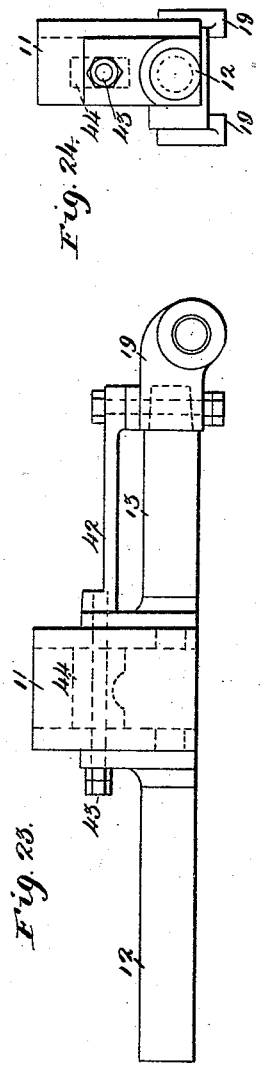
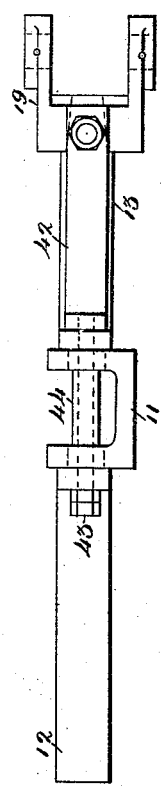
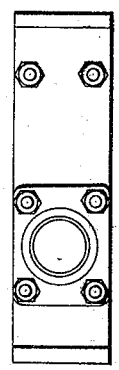
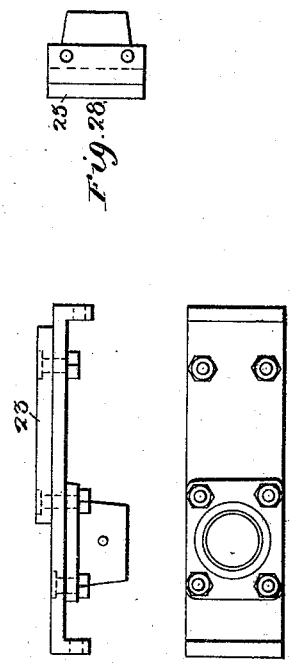
Witnesses
Inventor
Julius Frankenberg.
By his Attorneys,
Keller & Starek

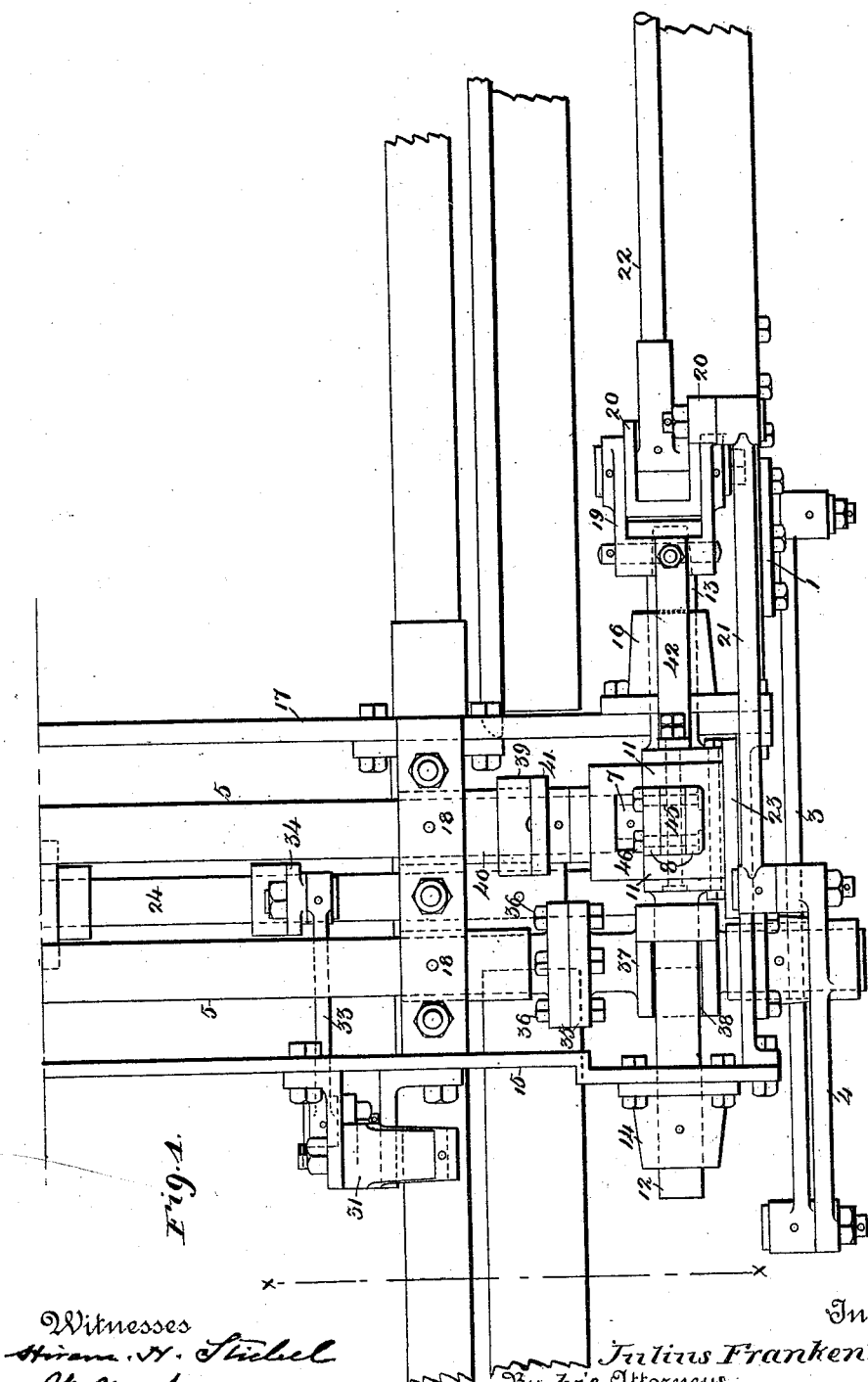

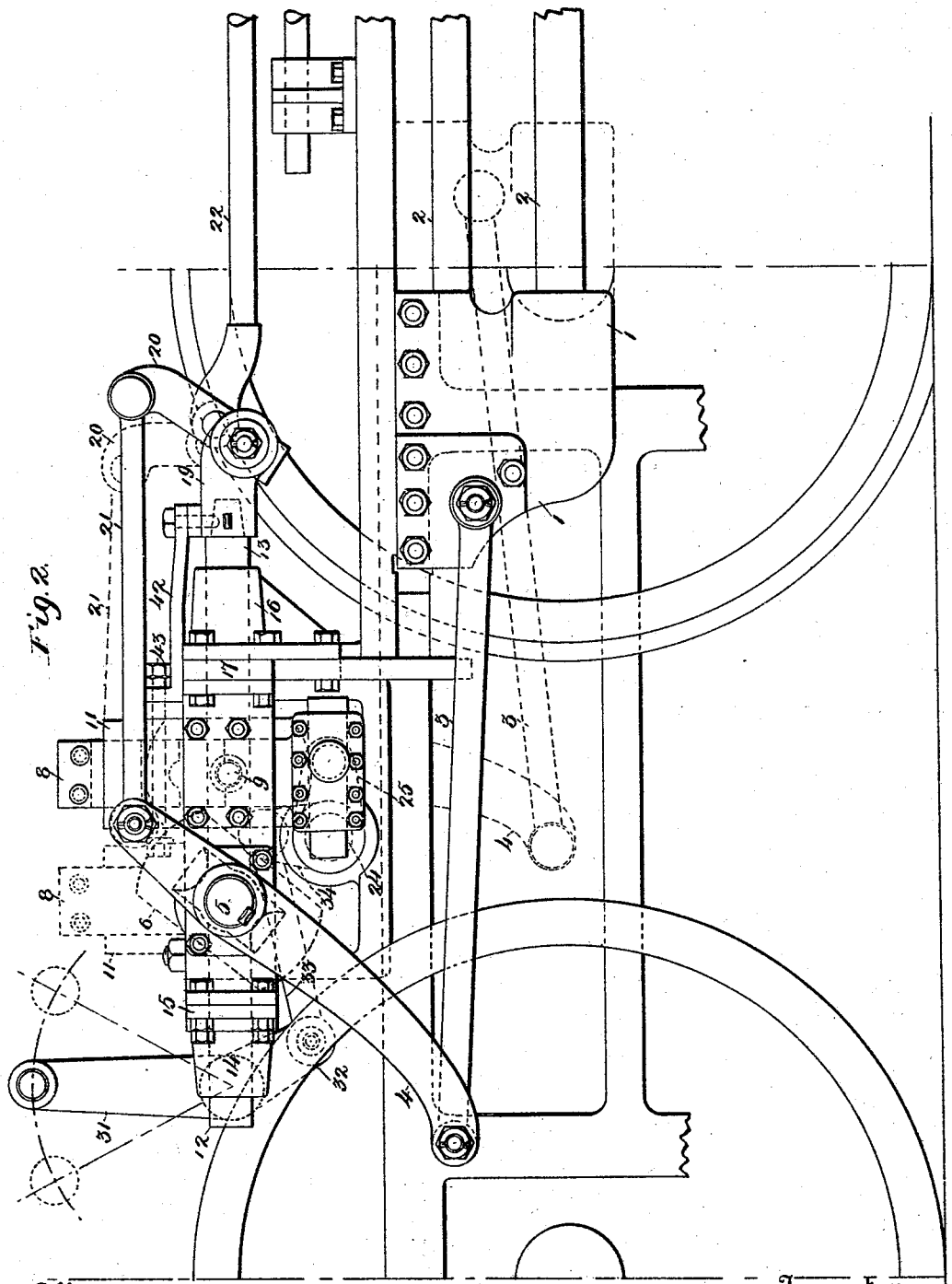

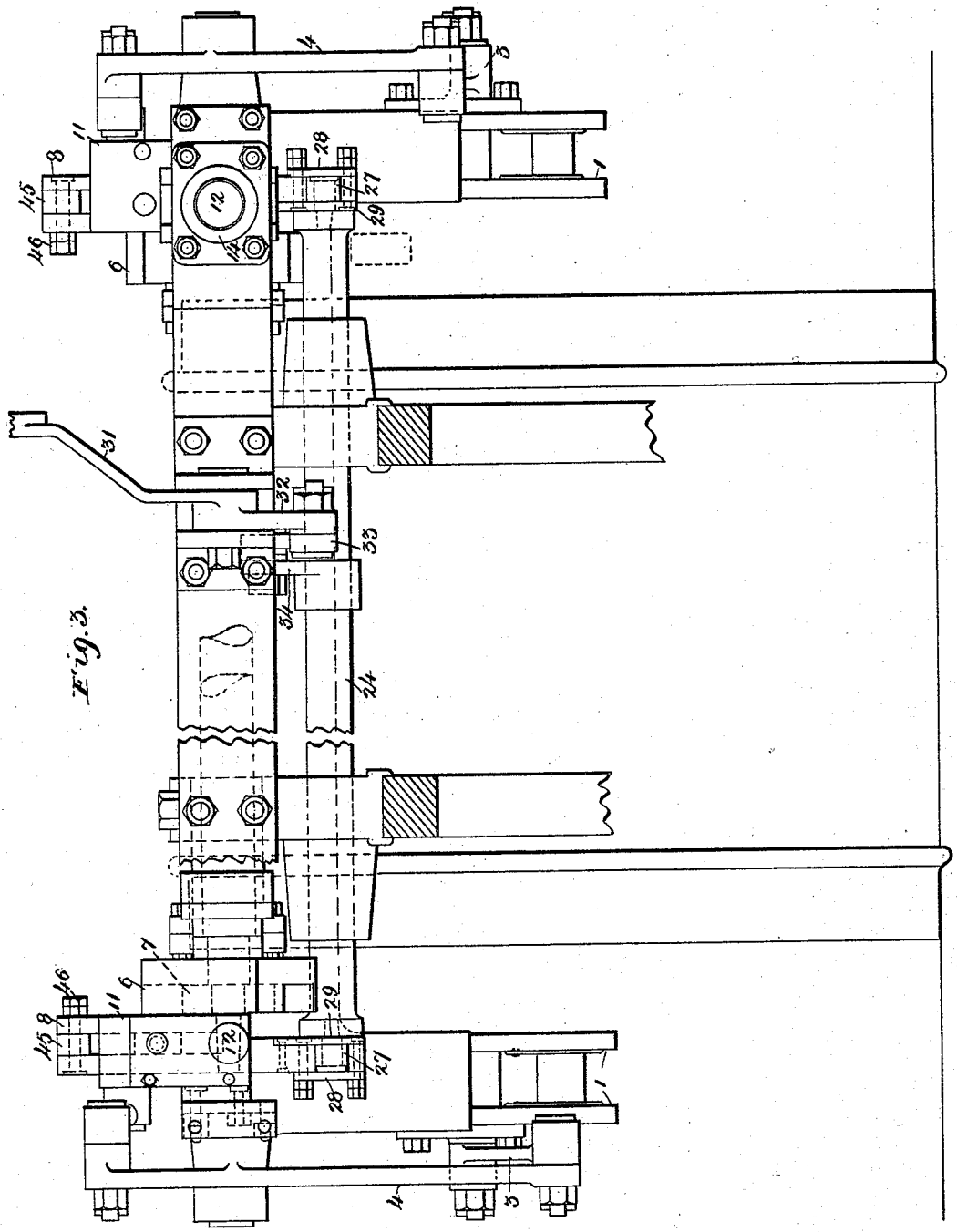

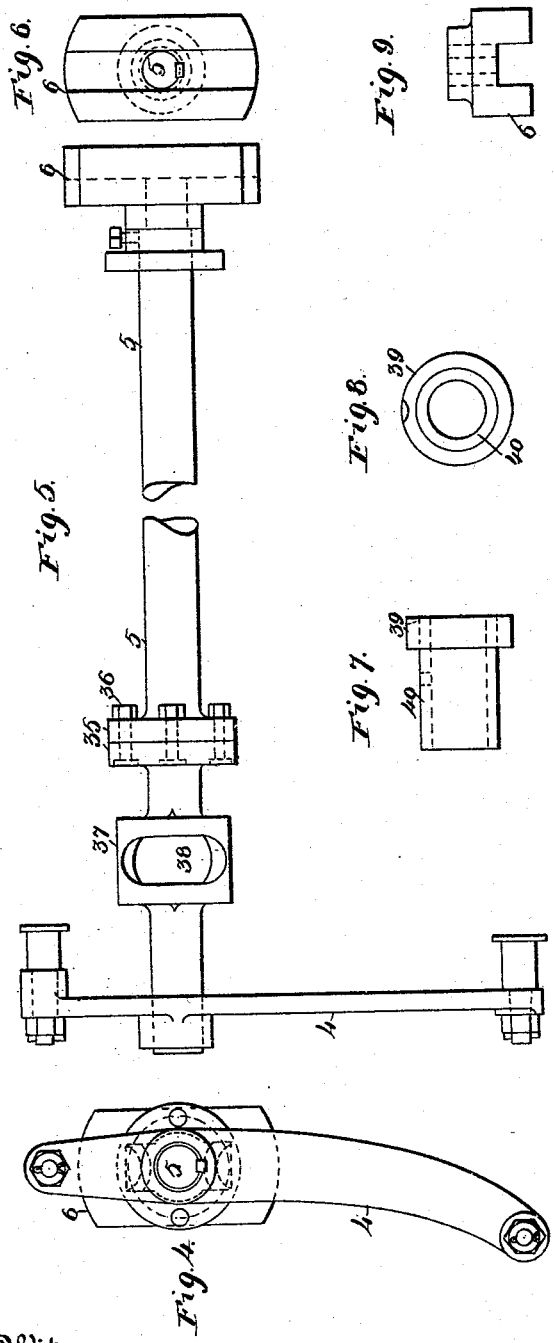

UNITED STATES PATENT OFFICE.

JULIUS FRANKENBERG, OF ST. LOUIS, MISSOURI, ASSIGNOR OF ONE-FOURTH TO HIRAM H. STIEBEL, OF SAME PLACE.

LOCOMOTIVE VALVE-GEAR.

SPECIFICATION forming part of Letters Patent No. 543,473, dated July 30, 1895.

Application filed January 10, 1895. Serial No. 534,458. (No model.)

*To all whom it may concern:*

Be it known that I, JULIUS FRANKENBERG, a citizen of the United States, residing at St. Louis, State of Missouri, have invented certain new and useful Improvements in Locomotive Valve-Gear, of which the following is a full, clear, and exact description, reference being had to the accompanying drawings, forming a part hereof.

My invention has relation to improvements in valve-gear; and it consists in the novel arrangement and combination of parts more fully set forth in the specification and pointed out in the claims.

In the drawings, Figure 1 is a plan view of one side of the locomotive-frame, showing my invention applied thereto. Fig. 2 is a side elevation of the same. Fig. 3 is an end section on line $x\,x$ of Fig. 1 with certain parts removed. Fig. 4 is an end view of one of the rock-shafts, showing the rocking arm secured thereto at one end and the connecting-link at the opposite end. Fig. 5 is a side elevation of the same. Fig. 6 is a detail elevation of the open end of the connecting-link. Fig. 7 is a side elevation of the detached case-hardened ring and bushing embracing the rock-shaft in the rear of the connecting-link. Fig. 8 is a front end view of the same. Fig. 9 is a top plan view of the link shown in Fig. 6. Fig. 10 is a top plan view of the short section of the rock-shaft shown in Fig. 5. Fig. 11 is an end view of the tumbling-shaft, showing the relative positions of the reverse-bars and guide-blocks carried by the arms secured at opposite ends of the said shaft. Fig. 12 is a side view of the same. Fig. 13 is a plan of the outer plate forming the outer wall of the housing, within which the guide-block is confined at the lower end of the reverse-bar. Fig. 14 is an end view of the same. Fig. 15 is a plan of the link-block. Fig. 16 is a side view of the same. Fig. 17 is a plan of the inner plate forming the inner wall of the housing referred to. Fig. 18 is an end view of the same. Fig. 19 is a plan of the guide-block for the lower end of the reverse-bar. Fig. 20 is a side view. Fig. 21 is a front view of the reverse-bar. Fig. 22 is a side view of the same. Fig. 23 is a side view of the oscillating guide-rods, to which the reverse-bar guide is secured and to the free end of one of which guide-rods is secured the fork carrying the cut-off lever. Fig. 24 is an end view of the same. Fig. 25 is a plan view of the same. Fig. 26 is a side view of a portion of the frame and guide-plate (secured thereto) for the reverse-bar guide. Fig. 27 is an inner plan view of the same, and Fig. 28 is a detail in side elevation of one of the bearings for the short section of the rock-shaft.

My invention is an improvement in that class of locomotive valve-gear to which motion is imparted through direct connections with the cross-head—that is, without the use of eccentrics and radial links.

It has for its object, first, to reduce the number of operating parts to a minimum, thereby minimizing the friction consequent to their co-operation; second, to reduce to a minimum the number of rock-shafts involved in the transmission of the motion imparted to the slide-valve; third, to effect a constancy of lead under all conditions of travel of the slide-valve both on the forward and backward stroke; fourth, to make the points of cut-off for both sides of the engine precisely alike; fifth, to preserve a constancy of lead under conditions of increased valve travel; sixth, to attain an increased valve travel which is practically without limit except so far as the capacity of the engine might limit the same without undue strain to the gear mechanism, and, seventh, to effect other and further advantages which are the outcome of the specific construction I employ and which in detail may be described as follows:

Referring to the drawings, 1 represents a cross-head of ordinary construction adapted to reciprocate within the guides 2. To the rear end of each cross-head is pivotally secured a rod 3, the opposite end of which is pivotally secured to the lower end of a long rocking arm 4, which is keyed above its medium portion to one end of the rock-shaft 5. Of the rock-shafts 5 there are two, the second rock-shaft being correspondingly connected at its opposite end—that is, on the opposite side of the engine—to the cross-head on the other side of the locomotive, as shown in dotted lines in Fig. 2. To the end of each rock-shaft opposite to that at which the arm 4 is keyed is keyed a connecting-link 6, U-shaped in cross-section, which is disposed symmetrically about the axis of the rock-shaft, the center line of the link and that of the arm 4 lying in the same plane, as best seen in Fig. 4. Within the link 6 is adapted to slide a link-block 7 of suitable length, whose relative position in the link can be shifted at will by means of the reverse-bar 8, to which it is pivotally secured by a pin 9, forming part of the reverse-bar, which pin enters a suitable opening 10 at the middle of the link-block. The variable vertical positions of the reverse-bar are controlled by the connections between it and the tumbling-shaft, which will be hereinafter referred to. In its variable vertical positions the reverse-bar is guided by the reverse-bar guide 11, which is secured to and is carried by the guide-rods 12 and 13, the former guide-rod having a bearing 14 in the brace 15 and the latter having a bearing 16 in the guide-yoke 17, the brace 15 being secured to the rocker-boxes 18 18 and extending entirely across the engine-frame. The free end of the guide-rod 13 carries a fork 19, between the members of which is pivoted the lower end of the cut-off lever 20, whose upper end is connected to the upper end of the arm 4 by means of a rod 21. The axes of the guide-rods 12 and 13 are in the same straight line and lie in the common plane of the axes of the rock-shafts. To the lower end of the cut-off lever 20 is pivotally secured one end of the valve-rod 22, the opposite end leading to the ordinary slide-valve. (Not shown.) To the side of the engine-frame is secured a plate 23, which assists in guiding the reverse-bar guide and the reverse-bar in their horizontal reciprocating motion, as hereinafter to be explained.

It is to be understood that the guide-rods 12 and 13, to which the reverse-bar guide 11 is secured, are susceptible of a horizontal rectilinear reciprocating motion within their bearings, and as the reverse-bar 8 is confined within its guide it will be carried bodily by said guide when reciprocating motion is imparted to the latter. Under such circumstances it is necessary of course to guide the reverse-bar so that as it reciprocates with the reverse-bar guide the bar shall be confined to a horizontal reciprocating motion, whatever may be its relative vertical position or elevation to which for the time being it has been shifted by the operation of the tumbling-shaft and the parts connecting said shaft to the reverse-bar.

The means for confining the reverse-bar to a horizontal reciprocating motion—that is to say, for confining its motion within a horizontal plane—is as follows: Secured to each end of the tumbling-shaft 24, which has its bearings in the rocker-boxes 18, is a fixed arm 25, the two arms extending, however, in diametrically-opposite directions, which must of course be the case to move the slide-valves, which are on opposite sides of the engine, in proper directions, as will hereinafter more fully appear. At the free end of the arm 25 is a pin 26, which carries the guide-block 27, by which the reverse-bar is guided horizontally and by which it is supported. The connection between the said guide-block 27 and the reverse-bar is effected as follows: The guide-block 27 is confined within a housing formed by the plates 28 and 29, bolted to and depending from the opposite sides of the lower end of the reverse-bar 8, the plate 29 having a longitudinal slot 29' for the accommodation of the pin 26, by which the block 27 is secured to the arm 25, the head 30 of the said pin coming opposite to the rounded opening 30' in the plate 28, through which the pin may be removed when desired. It is obvious of course that whatever may be the elevation of the block 27, forming a support for the reverse-bar, the latter can only move horizontally during its reciprocation with the reverse-bar guide, since it is confined to this horizontal movement by the guide-block 27, (which for any position of the tumbling-shaft may be considered fixed, as subsequently to be explained,) secured to the arm 25, the slot 29' formed in the plate 29 of the housing permitting of a horizontal riding of the reverse-bar over the block by allowing the pin 26 to ride back and forth in said slot. It is of course obvious that it is the slotted plate 29 and the pin 26 which movably secure the reverse-bar to the guide-block 27.

The tumbling-shaft is operated from the cab of the locomotive by pulling the reverse-lever, (not shown,) which is connected by the reach-rod (not shown) to the lever 31, whose short arm 32 is pivotally connected to a rod 33, which is in turn secured to the arm 34, keyed to the tumbling-shaft. It is obvious from these connections that a tripping of the lever 31 in one direction or the other will oscillate the tumbling-shaft correspondingly, and so lower or elevate the guide-block 27 at the end of the arm 25 at the end of the shaft. It is also obvious that by reason of the fact that the arms 25 on opposite ends of the tumbling-shaft extend in diametrically-opposite directions, that as the block 27 on one side of the engine is raised that on the other end is correspondingly lowered, this of course being necessary to move the valves, which are on opposite sides of the engine, in a direction to impart the same direction to the drive-wheels.

Each rock-shaft 5 is formed of two sections secured together at the flanges 35 by the bolts 36, the short section of the shaft being located at that end which carries the long arm 4. The short section has disposed near its medium portion an expanded portion 37, having an enlarged opening 38 for the accommodation of the horizontally-reciprocating guide-rod 12, which carries the reverse-bar guide. By this arrangement the guide-rods 12 and 13 and the parts secured thereto are permitted to reciprocate without being interfered with by the oscillating rock-shafts, and the number of rock-shafts, too, is reduced to a minimum. To prevent any longitudinal shifting of the rock-shafts during the travel of the engine, and consequent displacement of the link 6, and to keep the latter constantly in contact with the reverse-bar, a case-hardened ring 39, passed over a bushing 40 through which the shaft passes, is placed in the rear of the link, a suitable steel or iron buffer-ring 41, secured to the shaft, being interposed between the link and the ring 39. As seen best in Figs. 23 and 25, the walls of the reverse-bar guide are reinforced by a brace 42, bolted, respectively, to one end of the guide-rod 13 and to one of the said walls, the same bolt 43 which secures the end of the brace 42 to the wall securing at the same time a reinforcing-block 44 between the two walls, the bolt 43 passing entirely through the said block and secured by a nut at the outer end. It is for the purpose of accommodating the block 44 that the reverse-bar is made forked, as shown in Fig. 22 and as also shown in Fig. 12. When the reverse-bar is once in position within the reverse-bar guide, the free ends of the members of the fork of the reverse-bar are closed or connected by a connecting-block 45, secured by suitable bolts 46. (See Fig. 12.)

The operation of the valve-gear will be best understood by a reference particularly to Figs. 1 and 2, it being remembered, too, that the mechanism on one side of the locomotive is duplicated on the other side, the only change being that the arm 25 at one end of the tumbling shaft extends in one direction and that at the opposite end in a diametrically-opposite direction, so that the action on the valves, which are on opposite sides, may be simultaneously in opposite directions to propel the driving-wheels in proper direction. The operation is best explained in connection with the rock-shaft 5 on the right of Figs. 1 and 2—that is, the rock-shaft toward the front of the engine. We will start with the position of the parts in mid-gear—that is, the position where the slide-valve has just opened the valve-port an amount equal to the lead—in which position the parts are as indicated in Fig. 2, and the lever 31 stands vertically. Under these circumstances the reverse-bar 8 and link-block 7 are held in such a position by the arm 25 of the tumbling-shaft that the pivotal pin 9 of the reverse-bar, to which the link-block is secured, is concentric with the axis of the rock-shaft. As the cross-head is reciprocated, it will, by the intermediate connections of rod 3 and arm 4, impart an oscillating motion to the rock-shaft on the left, and this latter, by connections of rod 21, cut-off lever 20, and valve-rod 22, will impart a reciprocating motion to the slide-valve to an extent equal to twice its lap and lead—that is to say, it will be the regular throw or travel of the valve. With the position of the lever 31 as indicated in full lines in Fig. 2, when, as just stated, the pin carrying the link-block is concentric with the axis of the rock-shaft, it is apparent that as the right-hand rock-shaft oscillates it will impart only an oscillating motion to the link-block carried by the link 6, but no motion of any kind will be communicated to the guide-rods 12 and 13, nor to the reverse-bar guide carried by them, nor to the lower end of the cut-off lever 20, which is pivoted to the forked end of the guide-rod 13. To increase the throw of the valve (not shown) secured to the end of the valve-rod 22—when, for example, it is desirable to drive the engine forward—the lever 31 is tripped to the dotted position indicated on the right of said lever, under which circumstances, by the connections 32 33 34, the tumbling-shaft will be turned so as to throw the arm 25, carrying the guide-block 27, upward, and thus raise or elevate within its guide the reverse-bar carried by said block and simultaneously raise the link-blocks secured to said reverse-bar, (of course the reverse of these operations taking place on the opposite side of the engine, as is obvious from Figs. 11 and 12.) When the reverse-bar and link-block are thus raised, of course the pin forming part of the reverse-bar and to which pin the link-block is secured, is now in a position eccentric to the axis of oscillation of the rock-shaft. The pivotal point of the link-block, being now eccentric to the axis of oscillation of the rock-shaft, will no longer remain stationary as before, but will receive a rectilinear reciprocating horizontal motion from the oscillating motion of the rock-shaft. This horizontal rectilinear reciprocating movement results from the fact that the lower end of the reverse-bar being guided and held by the guide-block 27, as already explained, it can only move in a horizontal plane or rectilinearly, during the oscillatory movement of the rock-shaft. Of course with a horizontal reciprocating motion imparted to the reverse-bar, the reverse-bar guide, guide-rods 12 and 13, and fork 19 will also reciprocate within the bearings 14 and 16 and guide-plate 23, and thus an increased throw of the valve will be effected, the lower end of the cut-off lever 20 receiving a reciprocating motion, in addition to the oscillating motion imparted to its upper end by reason of the reciprocation of the cross-head controlling the left-hand rock-shaft, as already explained. To run the engine backward, the lever 31 is tripped to the left-hand dotted position shown in Fig. 2, when the reverse of the operations just described takes place.

It will be noticed that for any increased throw of the valve the only motion imparted to the link-block is a horizontal or rectilinear reciprocating motion, and under no circumstances a curve, thus reducing to a minimum the friction between the parts constituting the gearing and removing any strains. It is further to be noted that both sides of the engine are affected precisely alike; that the increased valve-throw is practically without limit, the said throw being the greater the farther the center of the link-block is removed from the center of oscillation or axis of the rock-shaft, which distance is controlled or determined by the relative vertical position of the guide-block 27 carried by the end of the tumbling-shaft.

It will further be noted that whatever be the increased throw of the valve, the lead remains the same on both forward and backward stroke, and that the points of cut-off are always alike.

It is to be further noted that the present invention is not limited in its application to locomotive engines, but may be employed on stationary engines as well.

Having described my invention, what I claim is—

1. In a locomotive valve gear, a suitable rock shaft, a cross head, intermediate connections for imparting an oscillatory motion to said shaft, a slide valve in operative connection with said rock shaft and adapted to be reciprocated by the latter, a second rock shaft, a link carried by said second rock shaft, a link block in movable contact with said link adapted to be oscillated by said second rock shaft during the normal throw of the valve, a tumbling shaft, and intermediate connections between said tumbling shaft and the link block for imparting a rectilinear reciprocating motion to the latter for an increased throw of the valve, substantially as set forth.

2. In a locomotive valve gear, a rock shaft, means for oscillating the same from the crosshead of the locomotive, a second rock-shaft, a link carried at one end of the same, suitable mechanism at the opposite end for oscillating said second rock-shaft, a reverse bar, a link block movable in said link and pivotally secured to the reverse bar, a tumbling shaft, intermediate connections between the tumbling shaft and the reverse bar for shifting the position of the latter and the link block along the link, and a suitable guide block for the reverse bar for confining the latter to a rectilinear reciprocating motion during the oscillation of the second rock shaft for any increased throw of the valve, substantially as set forth.

3. In a locomotive valve gear, one or more rock shafts, an enlarged opening in each shaft at one end thereof, guide rods passing through said openings and in operative connection with the slide valve, suitable bearings for said guide rods, and means for reciprocating said guide rods for any increased throw of the valve, substantially as set forth.

4. In a locomotive valve gear, a suitable rock shaft, a cross head, intermediate mechanism between said cross head and rock shaft for oscillating the latter, a second rock shaft, a link carried by the same, a movable link block having a pivotal point normally concentric with the axis of oscillation of the second rock shaft, a reverse bar controlling the position of the link block within the link, a reverse bar guide, guide rods secured to said reverse bar guide, a cut-off lever carried at the end of one of said guide rods, a tumbling shaft, intermediate connections between the tumbling shaft and the reverse bar for operating the latter, and a guide block carried by the tumbling shaft for confining the reverse bar, the reverse bar guide, guide rods and link block to a reciprocating motion during an increased throw of the slide valve, substantially as set forth.

5. In a locomotive valve gear, a tumbling shaft, a movable reverse bar in operative connection with the same, a rock shaft, a link carried by said rock shaft, an oscillating link block having a pivotal point normally concentric with the axis of oscillation of the rock shaft, a pivotal connection between the reverse bar and the oscillating link block for imparting a rectilinear motion to the latter when shifted from its normal position within the link for an increased throw of the valve, substantially as set forth.

6. In a locomotive valve gear, two independent rock shafts, a rocking arm carried at the end of one of the shafts, suitable connections between said arm and the cross head, a link carried on the adjacent end of the second rock shaft, a movable link block within the link, a reverse bar to which said link-block is pivotally secured, a reverse bar guide for controlling the vertical positions of the reverse bar and link block, suitable guide rods secured on either side of the reverse bar guide, one of said rods passing through an opening of the first named rock shaft, a cut-off lever pivoted at its lower end to the end of the second guide rod, a suitable rod connecting the upper ends of the cut-off lever and rocking arm carried by the first rock shaft, a tumbling shaft, and a guide block carried thereby and controlling the path of the lower end of the reverse bar for varying the elevation of said reverse bar and link block carried thereby and imparting a reciprocating rectilinear motion to the reverse bar and link block when the latter is shifted from its normal position for an increased throw of the valve, substantially as set forth.

7. In a locomotive valve gear, a tumbling shaft, an arm carried at one end thereof, a pin at the free end of said arm, a guide block carried by said pin, a movable reverse bar, an inner plate at the lower end of the reverse bar having an elongated slot through which the pin carrying the guide block operates, and an outer plate at the lower outer end of the reverse bar, the said plates forming a housing for the guide block, substantially as set forth.

8. In a locomotive valve gear, a reverse bar guide having lateral walls, a guide rod on either side of the same, a reinforcing block for said walls located at the upper end of the same, a forked reverse bar confined within the reverse bar guide, the members of the fork embracing the reinforcing block of the reverse bar guide, and a connecting end block for the free ends of the members of the reverse bar, substantially as set forth.

9. In a locomotive valve gear, a suitable rock shaft, a tumbling shaft, a movable reverse bar in operative connection with the tumbling shaft, and suitable intermediate connections between the reverse bar and rock shaft for imparting a rectilinear motion to the reverse bar, substantially as set forth.

10. In a locomotive valve gear, a suitable rock shaft, a tumbling shaft, a movable reverse bar in operative connection with the tumbling shaft, a cut-off lever, suitable intermediate connections between the cut-off lever and the reverse bar, and suitable connections between the reverse bar and rock shaft for imparting a rectilinear motion to the reverse bar and one end of the cut-off lever for any increased throw of the slide valve, substantially as set forth.

11. In a locomotive valve gear, a suitable rock shaft, a rocking arm keyed to one end thereof, a cross head in operative connection with the lower end of the rocking arm, a second rock shaft, a cut-off lever pivoted at its lower end in operative connection with the said second rock shaft, the said lower end adapted to receive a rectilinear motion from said second rock shaft, and a connecting rod between the upper end of said cut-off lever and the upper end of the rocking arm of the first rock shaft for imparting an oscillatory motion to said upper end of the cut-off lever, substantially as set forth.

In testimony whereof I affix my signature in presence of two witnesses.

JULIUS FRANKENBERG.

Witnesses:
C. C. COWEN,
E. STAREK.